United States Patent
Krebes (10) Patent No.: US 10,639,862 B2
(45) Date of Patent: May 5, 2020

(54) FLEXIBLE, LOW PROFILE HEARTH PAD

(71) Applicant: Bernd Krebes, Bridgewater (CA)

(72) Inventor: Bernd Krebes, Bridgewater (CA)

( * ) Notice: Subject to any disclaimer, the term of this patent is extended or adjusted under 35 U.S.C. 154(b) by 0 days.

(21) Appl. No.: 13/724,966

(22) Filed: Dec. 21, 2012

(65) Prior Publication Data
US 2014/0178623 A1    Jun. 26, 2014

(30) Foreign Application Priority Data

Nov. 26, 2012 (CA) .................................. 2796814

(51) Int. Cl.
| | |
|---|---|
| *B32B 3/16* | (2006.01) |
| *B32B 9/00* | (2006.01) |
| *B32B 9/04* | (2006.01) |
| *B32B 15/20* | (2006.01) |
| *F24B 1/197* | (2006.01) |
| *F24B 13/00* | (2006.01) |

(52) U.S. Cl.
CPC ............... *B32B 3/16* (2013.01); *B32B 9/005* (2013.01); *B32B 9/041* (2013.01); *B32B 15/20* (2013.01); *F24B 1/197* (2013.01); *F24B 13/002* (2013.01); *B32B 2307/306* (2013.01); *B32B 2307/3065* (2013.01); *B32B 2471/04* (2013.01); *Y10T 428/166* (2015.01)

(58) Field of Classification Search
CPC ......... E04F 15/02016; E04F 15/02005; B32B 3/16; B32B 9/041; B32B 9/005; B32B 15/20; B32B 2471/04; B32B 2307/306; B32B 2307/3065; F24B 1/197; F24B 13/002; Y10T 428/166; E04D 1/28

USPC ..... 52/384, 287.1, 173.1, 588.1, 169.1, 232, 52/302.1, 311.2, 316, 396.01, 649.2, 52/655.1, 741.15, 741.3, 745.21, 747.11, 52/831, 846; 126/500; 428/141, 500, 428/195.1, 212, 328, 446, 474.4, 480, 428/522, 523, 100, 105, 113, 116, 142, 428/160, 172, 196, 201, 215, 222, 293.4, 428/313.3, 319.1, 32.71, 338, 354, 36.6, 428/36.9, 36.91, 402, 40.1, 411.1, 412, 428/413, 423.1, 423.3, 423.5, 423.7, 428/424.2, 424.4, 424.6, 424.8, 425

See application file for complete search history.

(56) References Cited

U.S. PATENT DOCUMENTS

| | | | | |
|---|---|---|---|---|
| 3,666,606 | A | * | 5/1972 | Stokes ................ E04F 13/0862 428/430 |
| 3,968,709 | A | | 7/1976 | Fowler |
| 4,233,792 | A | * | 11/1980 | Malavasi ......................... 52/387 |
| 4,567,704 | A | * | 2/1986 | Bernett et al. ................ 52/309.3 |
| 4,583,343 | A | * | 4/1986 | Camp ......................... 52/749.11 |

(Continued)

OTHER PUBLICATIONS

"Standard Thickness of Ceramic Tile", http://wiki.answers.com/Q/Standard_thickness_of_ceramic_tile, Jan. 20, 2012.*

*Primary Examiner* — Scott R. Walshon
*Assistant Examiner* — Jasper Saberi
(74) *Attorney, Agent, or Firm* — Thompson Hine LLP (57) ABSTRACT

A hearth pad for live ember protecting a floor. The hearth pad comprises a backing for being placed onto the floor. The backing is made of a flexible sheet material. A plurality of tiles is disposed on the backing and adhered thereto using a flexible adhesive. The tiles are made of a rigid material. A flexible filler is disposed in gaps between adjacent tiles.

21 Claims, 7 Drawing Sheets

(56) References Cited

U.S. PATENT DOCUMENTS

| | | | | |
|---|---|---|---|---|
| 5,550,338 | A * | 8/1996 | Hielscher | B32B 3/10 |
| | | | | 181/290 |
| 6,129,967 | A * | 10/2000 | Young | B32B 3/16 |
| | | | | 428/49 |
| 2002/0050107 | A1* | 5/2002 | Backowski | 52/287.1 |
| 2003/0124397 | A1* | 7/2003 | Kim | B32B 5/18 |
| | | | | 428/301.4 |
| 2004/0044103 | A1* | 3/2004 | Rooshenas | 524/2 |
| 2004/0238556 | A1* | 12/2004 | George | 221/96 |
| 2007/0151477 | A1* | 7/2007 | Walker | B27N 9/00 |
| | | | | 106/15.05 |
| 2009/0029096 | A1* | 1/2009 | Riddle | 428/95 |
| 2012/0279655 | A1* | 11/2012 | D'Agostino | E04F 15/08 |
| | | | | 156/331.7 |
| 2012/0291621 | A1* | 11/2012 | Sayre | F41H 5/0421 |
| | | | | 89/36.02 |

\* cited by examiner

ABLE, LOW PROFILE HEARTH PAD, in the name of inventor Bernd Krebes as inventor and owner. The entire contents of that application are incorporated by reference herein.

FLEXIBLE, LOW PROFILE HEARTH PAD

This application claims priority to Canadian Patent Application No. 2796814, filed on Nov. 26, 2012, entitled FLEXIBLE, LOW PROFILE HEARTH PAD, in the name of inventor Bernd Krebes as inventor and owner. The entire contents of that application are incorporated by reference herein.

FIELD

The present invention relates to hearth pads for live ember protection of a floor under a woodstove or pellet stove, and more particularly, relates to a hearth pad that is flexible and has a low profile.

BACKGROUND

While modern—also called "Certified"—woodstoves will not overheat a combustible floor, fire safety codes require installation of a non-combustible hearth pad under the woodstove which typically has to extend at least 450 mm in front of the loading door and 200 mm beyond the sides and the back of the woodstove to protect the floor from live embers that might fall from the woodstove while stoking the same or removing ashes therefrom. The hearth pad must be a continuous, non-combustible pad, which is typically made of floor tiles with grouting disposed on a concrete slab.

Unfortunately, provision of a concrete slab is difficult when a woodstove is to be installed on an existing floor, requiring either a portion of the floor to be removed or the slab to be placed on top of the floor raising the top surface of the hearth pad a substantial distance above the floor.

Another hearth pad comprises a tile backer board—for example, a DUROCK® cement board—with the tiles glued thereupon. A fitting plywood panel is glued to the bottom of the tile backer board to strengthen the same and the spaces between the tiles are filled with grout. The hearth pad is then placed onto the existing floor at the appropriate location before installation of the woodstove thereupon. As is evident, the top surface of the hearth pad is still a substantial distance above the floor.

To reduce the thickness of the hearth pad, the tile backer board is sometimes omitted and the tiles are directly glued onto the plywood panel. In order to provide sufficient strength, at least a ¾ inch plywood panel is employed. Therefore, the top surface of the hearth pad is still an undesirable distance above the floor.

Furthermore, the hearth pads are substantially rigid and, therefore, not capable of conforming to an un-even surface of the floor resulting in substantial gaps between the bottom surface of the hearth pad and the surface of the floor. Over time, the stresses due to the weight of a heavy woodstove placed thereupon cause cracks in the grout and the tiles.

It is desirable to provide a hearth pad that is sufficiently flexible to enable the same to approximately conform to an un-even surface of the floor.

It is also desirable to provide a hearth pad that has a low profile.

It is also desirable to provide a hearth pad that is light weight.

SUMMARY

Accordingly, one object of the present invention is to provide a hearth pad that is sufficiently flexible to enable the same to approximately conform to an un-even surface of the floor.

Another object of the present invention is to provide a hearth pad that has a low profile.

Another object of the present invention is to provide a hearth pad that is light weight.

According to one aspect of the present invention, there is provided a hearth pad. The hearth pad comprises a backing for being placed onto the floor. The backing is made of a flexible sheet material. A plurality of tiles is disposed on the backing and adhered thereto using a flexible adhesive. The tiles are made of a rigid material. A flexible filler is disposed in gaps between adjacent tiles.

According to an aspect of the present invention, there is provided a hearth pad. The hearth pad comprises a backing for being placed onto the floor. The backing is made of an aluminum sheet material. A plurality of porcelain tiles is disposed on the backing and adhered thereto using a polyurethane based adhesive. A sanded acrylic caulking filler is disposed in gaps between adjacent tiles. The hearth pad has an overall thickness of less than 13 mm and is capable of flexing at least 10 mm over a distance of approximately 1000 mm.

One advantage of the present invention is that it provides a hearth pad that is sufficiently flexible to enable the same to approximately conform to an un-even surface of the floor.

A further advantage of the present invention is that it provides a hearth pad that has a low profile.

A further advantage of the present invention is that it provides a hearth pad that is light weight.

BRIEF DESCRIPTION OF THE DRAWINGS

An embodiment of the present invention is described below with reference to the accompanying drawings, in which.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

It is noted that the hearth pad according to the invention and as described hereinbelow is intended for use with modern woodstoves as live ember protection of an existing combustible floor only. As is evident, the hearth pad according to the invention is not limited for use with woodstoves only, but is also applicable as live ember protection in combination with other solid fuel burning stoves such as, for example, pellet stoves.

Referring to FIGS. 1a to 1d, a hearth pad 100 according to a one embodiment of the invention is provided. The hearth pad 100 comprises a backing 110A to 110E—made of a flexible sheet material—for being placed onto the floor. A plurality of tiles 102—made of a rigid, sufficiently strong and fire-rated material—is disposed on the backing 110A to 110E and adhered thereto using a flexible adhesive. A flexible, fire-rated filler 104 is disposed in gaps between adjacent tiles.

Figure 3A:
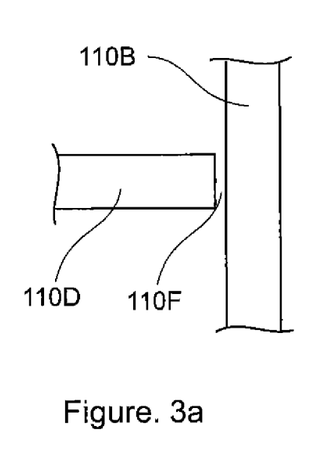
FIGS. 3a to 3c are simplified block diagrams illustrating different joint for use in the backing of the hearth pad according to an embodiment of the invention.
Figure 3B:
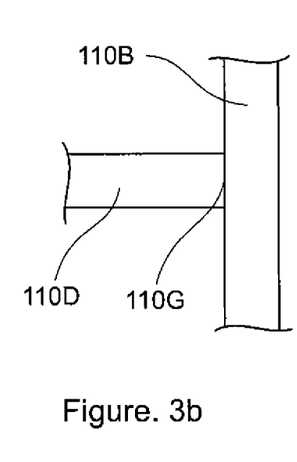
Figure 3C:
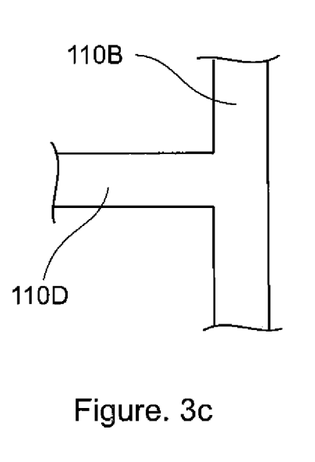
Figure 4:
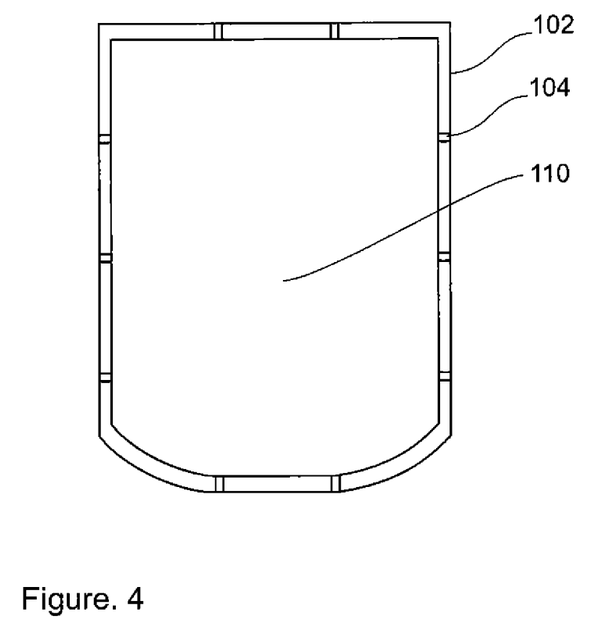
FIG. 4 is a simplified block diagram illustrating in a bottom view a different backing for use in the hearth pad according to an embodiment of the invention.

The backing can be made of a plurality of aluminum strips 110A to 110E having a thickness of approximately 1.5 mm which is substantially less than the thickness H1 of the tiles 102 to ensure a small overall height H—i.e. a low profile—of the hearth pad 100. The aluminum strips 110A to 110E are oriented along edges of the tiles 102 and have a width W1, W2—for example, W1=50-70 mm and W2=20-30 mm—for covering a sufficient portion of the bottom surface of the tiles 102 in order to properly support the same when a woodstove is placed thereupon. As illustrated in FIG. 3a, the aluminum strips 110A to 110E can be approximately abutted at each other at 110F but not physically attached for ease of assembly. Alternatively, as illustrated in FIG. 3b, the aluminum strips 110A to 110E are welded or otherwise affixed to each other at joint 110G, or provided as a single unit, as illustrated in FIG. 3c, using, for example, a laser cutting process. Further alternatively, as illustrated in FIG. 4, a single sheet 110, substantially covering the bottom surface of the hearth pad 100, is provided. Aluminum sheet material has been chosen as backing material for being corrosion resistant, light weight, having sufficient rigidity and flexibility. Alternatively, the backing is made of another sheet material such as steel or a semi-rigid, fireproof plastic material such as, for example, a suitable: PolyVinylChloride (PVC); PolyAmide (PA); or PolyPropylene (PP).

The tiles 102 may be porcelain tiles having a side length L1 between approximately 300 mm and 360 mm (between 12 inches and 14 inches) and a thickness H1 between 8 mm and 10 mm. Porcelain tiles—glazed or un-glazed—may be preferred for being substantially more dense than other ceramic tiles and, therefore, being substantially stronger and capable of withstanding substantially higher loads. Alternatively, other ceramic tiles are employed, for example, for supporting a lighter woodstove. Further alternatively, other suitable materials such as, for example, natural stone (granite or slate) are employed. Of course, tiles having various other sizes and shapes are also employable.

Figure 1A:
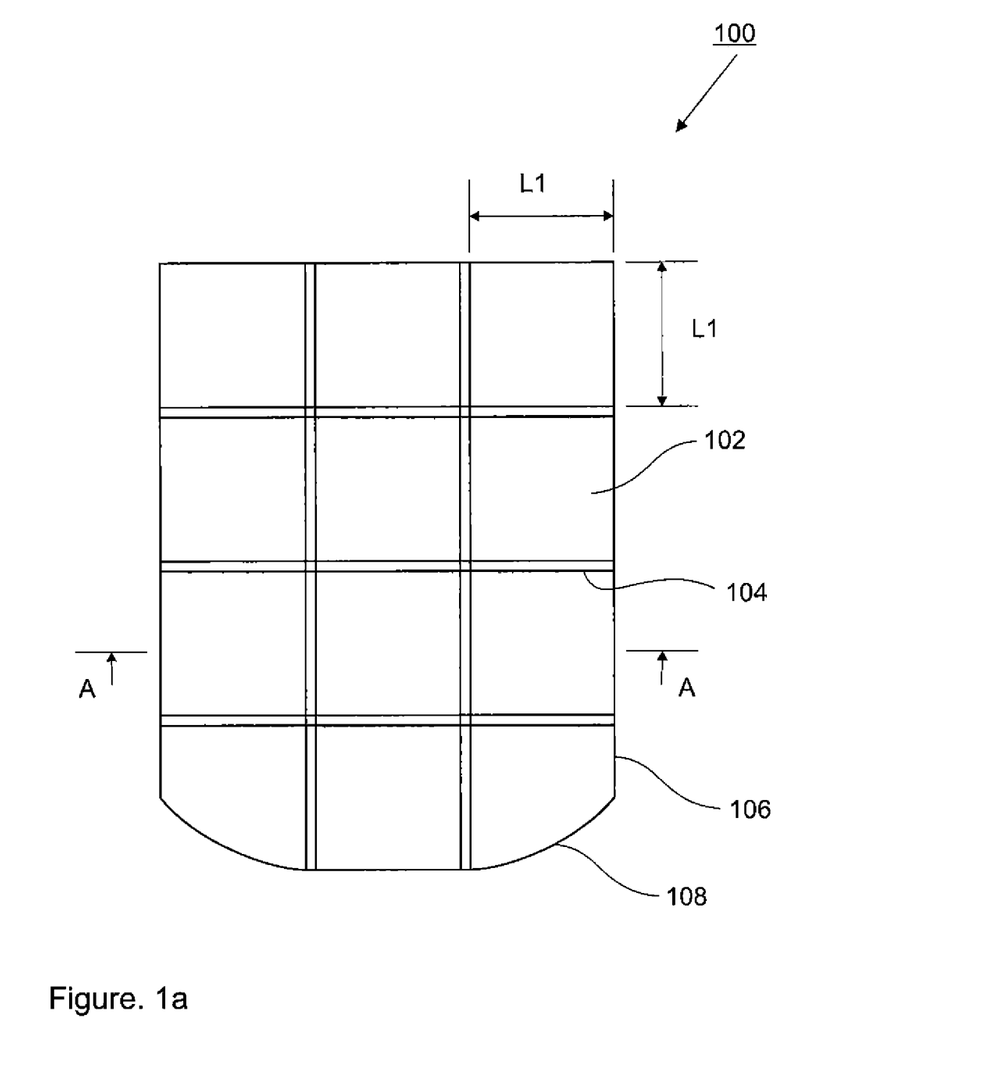
FIGS. 1a, 1b, and 1c are simplified block diagrams illustrating a top view, a bottom view, and a cross sectional view, respectively, of a hearth pad according to one embodiment of the invention.
Figure 1B:
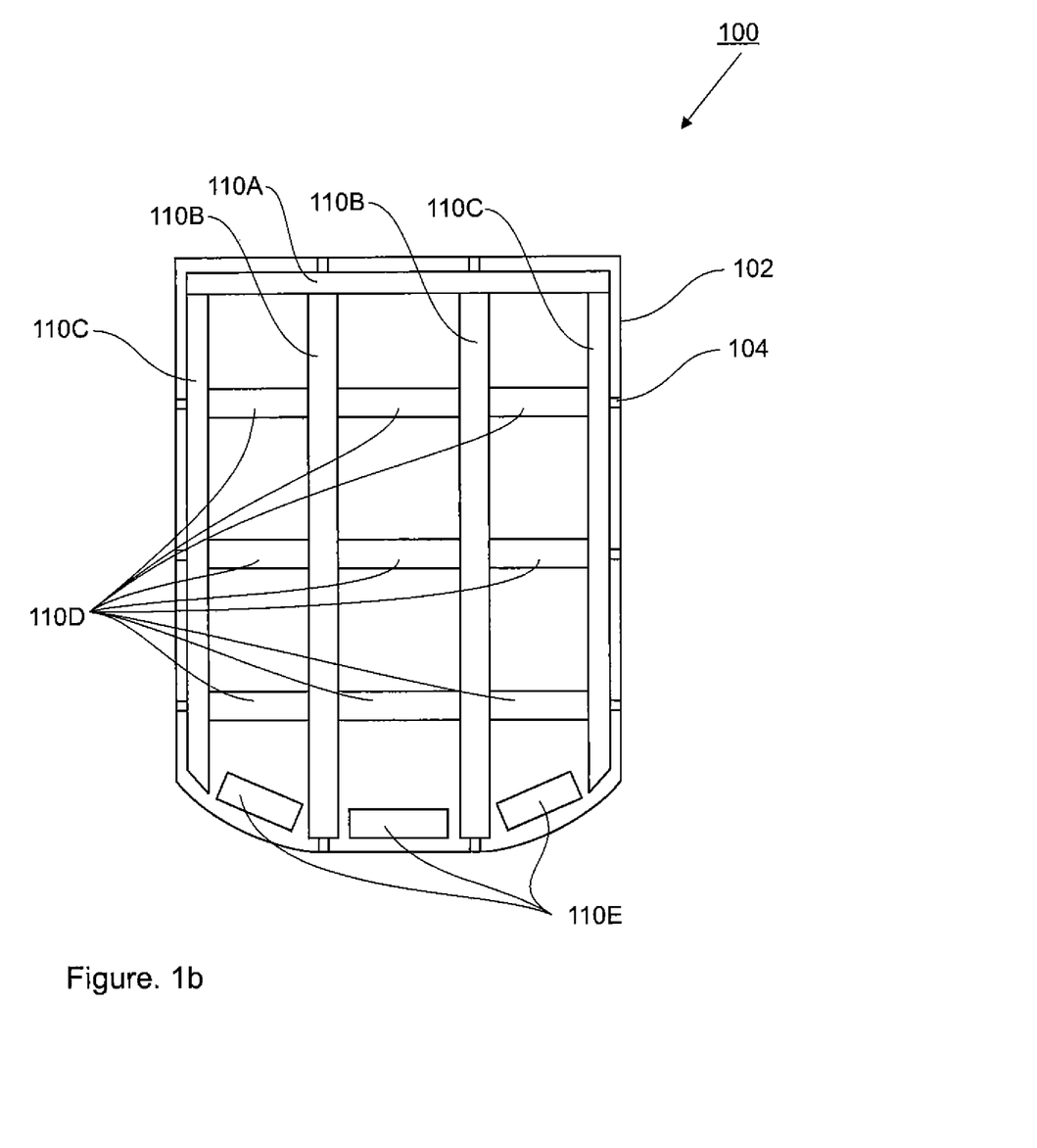
Figure 1C:
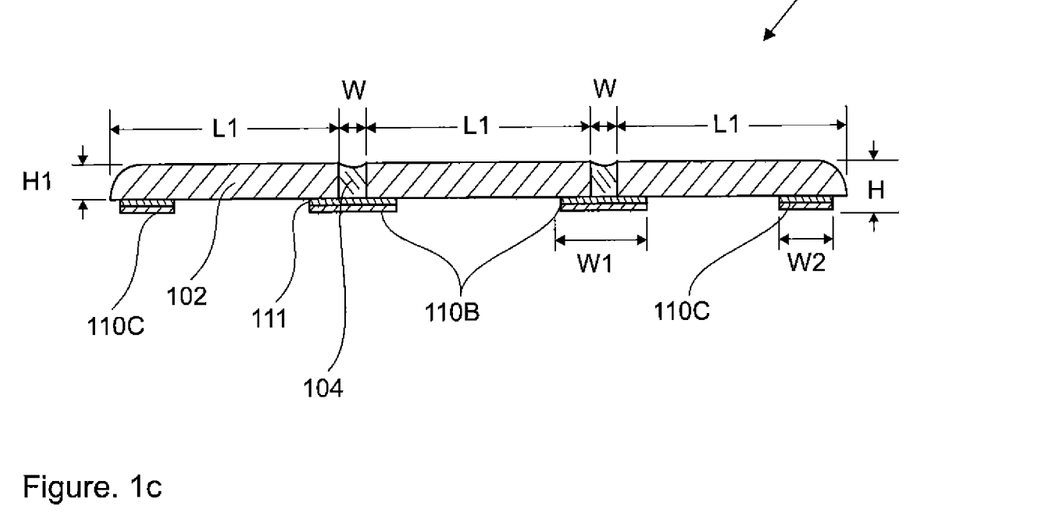
Figure 1D:
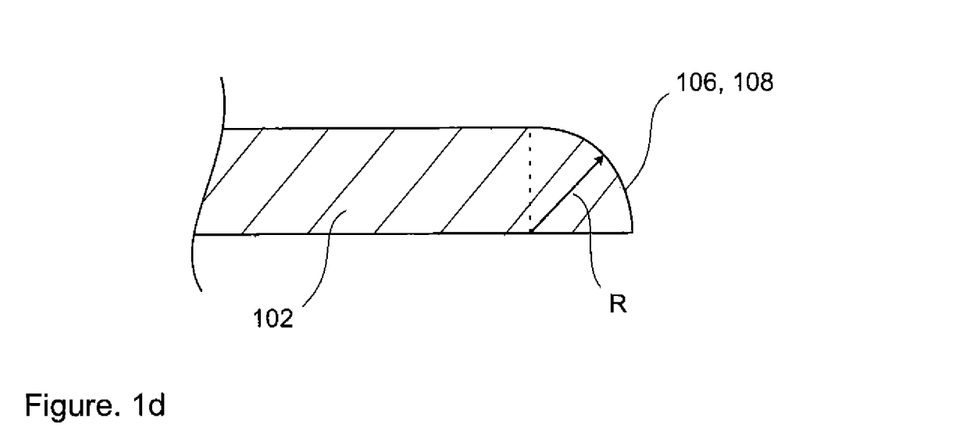
FIG. 1d is a simplified block diagram illustrating a detailed view of a rounded edge of the hearth pad according to an embodiment of the invention.

As illustrated in FIG. 1d, the outside edges 106, 108 of the tiles 102 are, in one case, quarter rounded edges cut in the tiles 102 with a router adapted for cutting porcelain and polished. Provision of rounded or beveled edges 106, 108 substantially prevents toe-stubbing when walking in vicinity of the stove.

The tiles 102 may be glued to the backing 110A to 110E using a polyurethane based flexible adhesive 111 such as, for example, PL PREMIUM® adhesive from LEPAGE® Brand Products, which provides a strong and flexible bond between the backing 110A to 110E and the tiles 102.

The width W of the gap between adjacent tiles 102 can be approximately 2-3 mm and the filler 104 is a fire-rated acrylic caulking—for example, a DAP® fire-rated silicone caulking—which is mixed with silica sand to provide a grout-like texture. Of course, numerous other products of acrylic caulking and sanded acrylic caulking are also employable as the filler 104.

Figure 1E:
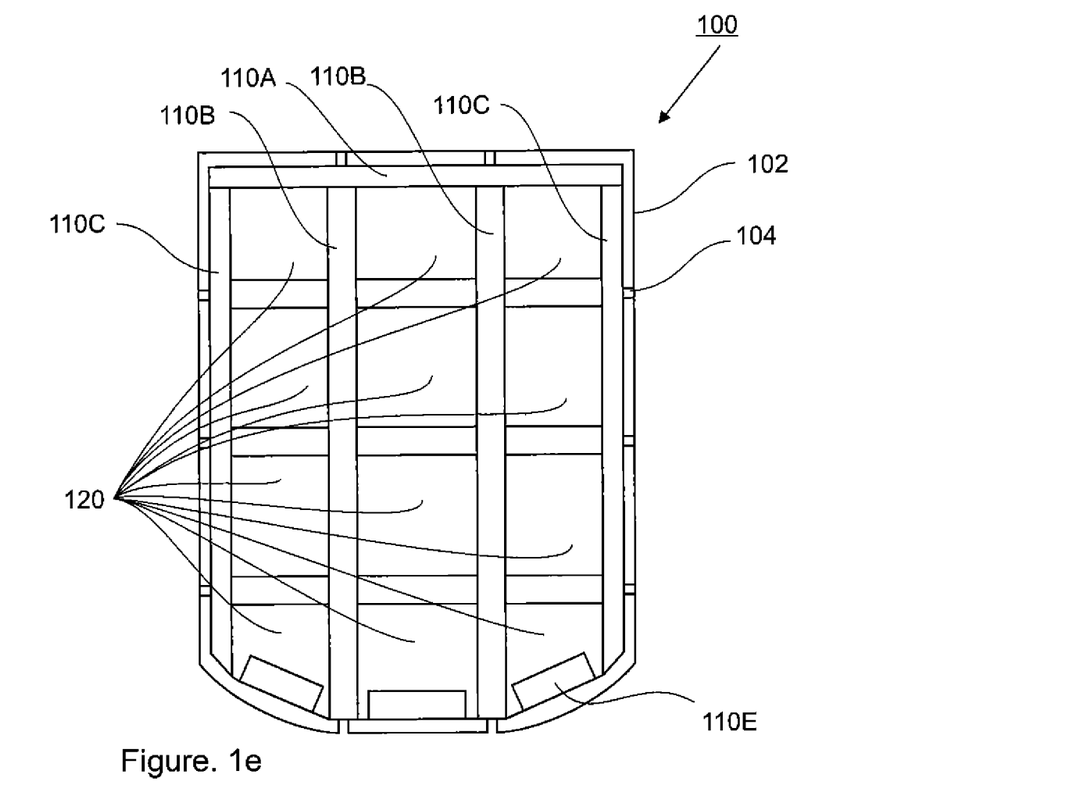
FIGS. 1e and 1f are simplified block diagrams illustrating a bottom view, and a cross sectional view, respectively, of a hearth pad according to another embodiment of the invention.
Figure 1F:
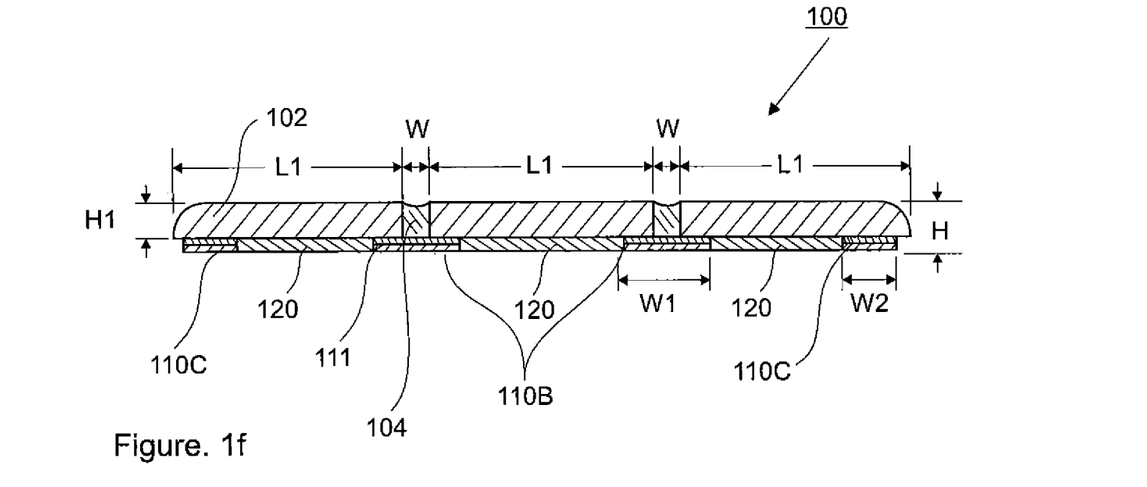

Optionally, as illustrated in FIGS. 1e and 1f, the spaces between the backing strips 110A to 110E are filled with a flexible mortar 120 such as, for example, the flexible polymer-modified mortar ULTRAFLEX™ LFT mortar from MAPEI® Americas. The flexible polymer-modified mortar is sufficiently flexible for not adversely affecting the flexibility of the hearth pad 100 and is also sufficiently rigid for supporting and strengthening the tiles 102. In particular, employment of the flexible mortar 120 is advantageous in combination with tiles 102 made of a weaker material than porcelain such as, for example, ceramic or slate, resulting in a substantially increased strength enabling such tiles 102 to withstand substantially higher loads.

Figure 2:
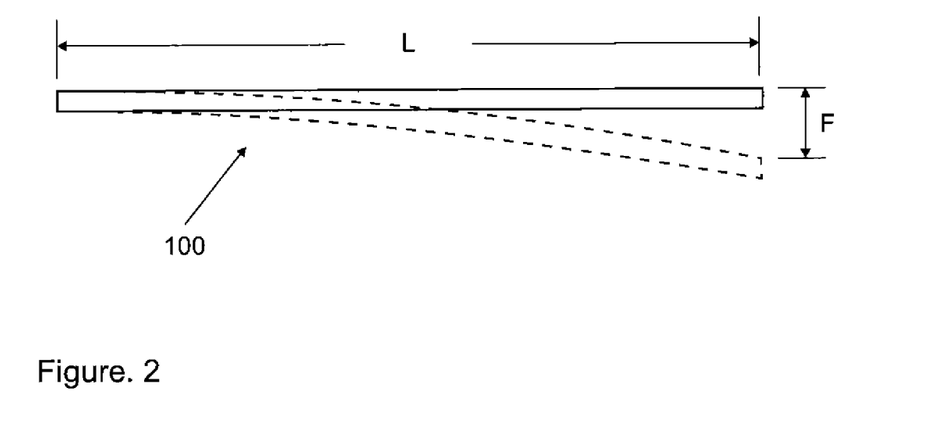
FIG. 2 is a simplified block diagram illustrating in a side view the flexibility of the hearth pad according to an embodiment of the invention.

The above combination of materials employed provides a low profile hearth pad 100 that: has an overall height H of 10-12 mm; is sufficiently flexible to approximately conform to an un-even surface of the floor; and is sufficiently rigid to prevent the device from substantially flexing, for example, when being lifted during transport and installation. The hearth pad 100 is capable of flexing F of 10 mm over a distance L of 1000 mm, as illustrated in FIG. 2, which is sufficient for conforming to most un-even floor surfaces.

For simplicity, only one shape of the hearth pad 100 is illustrated. But, as is evident, the hearth pad 100 is implementable having various different sizes and shapes such as, square, rectangular, circular, oval, and combinations thereof.

Figure 5A:
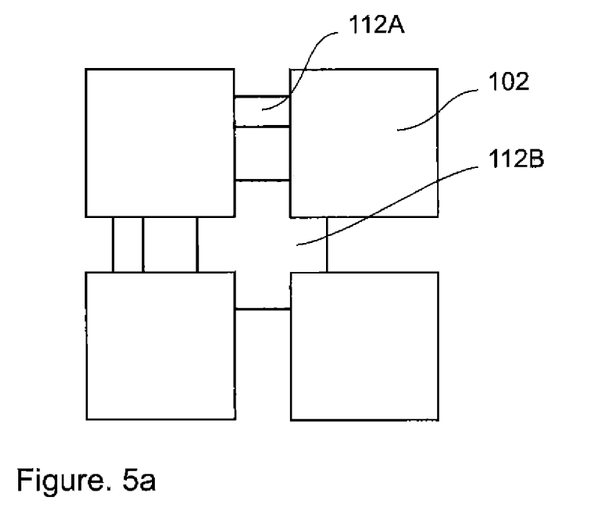
FIG. 5a is a simplified block diagram illustrating in a top view spacing elements for facilitating assembly of the hearth pad according to an embodiment of the invention.
Figure 5B:
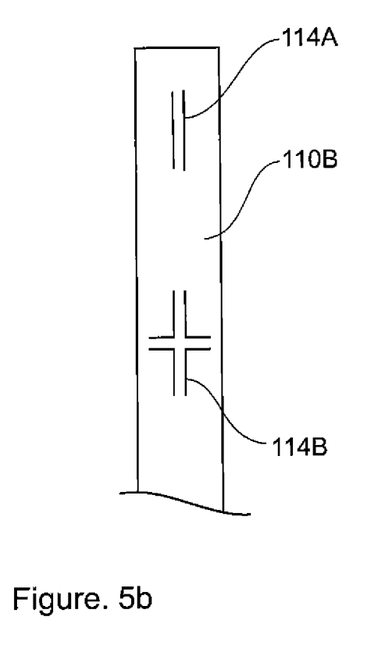
FIG. 5b is a simplified block diagram illustrating in a top view markers disposed on the backing for facilitating assembly of the hearth pad according to an embodiment of the invention; and, FIG. 5c is a simplified block diagram illustrating in a top view interlocking features disposed in the backing for facilitating assembly of the hearth pad according to an embodiment of the invention.
Figure 5C:
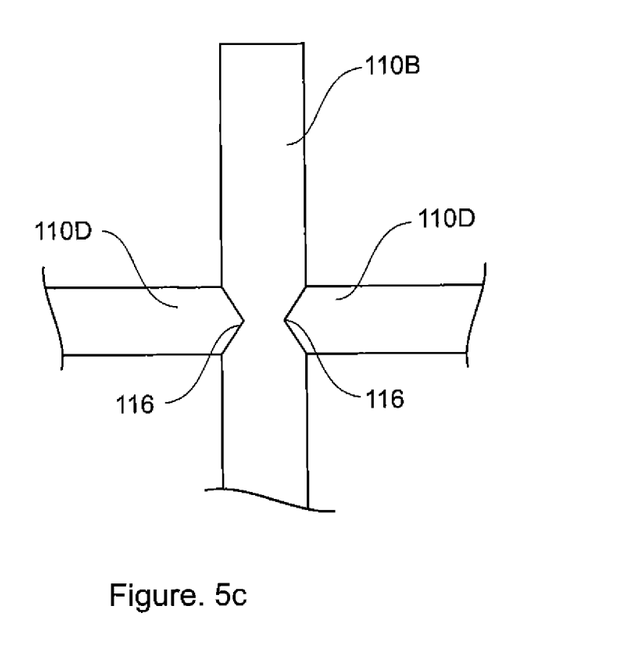

Optionally, the hearth pad 100 is provided as a kit for do-it-yourself assembly. For example, the backing is placed onto a flat surface with the strips 110A to 110E having the proper alignment which is facilitated, for example, by providing the strips 110A to 110E with interlocking features 116, as illustrated in FIG. 5c. The tiles 102 are then glued to the backing with the proper alignment of the tiles 102 being facilitated, for example, by provision of spacing elements 112A, 112B for being placed between the tiles 102 or markers 114A, 114B disposed on the strips 110A to 110D, as illustrated in FIGS. 5a and 5b. After curing of the adhesive, the filler 104 is disposed in the gaps between the tiles 102.

The present invention has been described herein with regard to certain embodiments. However, it will be obvious to persons skilled in the art that a number of variations and modifications can be made without departing from the scope of the invention as described herein.

What is claimed is:
1. A hearth pad comprising:
   a backing for being placed onto a floor, the backing being an aluminum sheet;
   a plurality of tiles directly bonded to the backing using a flexible adhesive, the tiles being made of a rigid material and forming a top surface of the hearth pad; and,
   a flexible filler disposed in gaps between adjacent tiles, wherein a thickness of the backing is substantially less than a thickness of the tiles and wherein the backing has sufficient rigidity to substantially prevent flexing of the hearth pad during transport and installation and wherein the backing has sufficient flexibility to sub- stantially prevent cracking of the tiles when a woodstove or pellet stove is placed thereupon and,
wherein the hearth pad has an overall thickness of less than 13 mm.

2. The hearth pad according to claim 1 wherein the tiles are porcelain tiles or ceramic tiles.

3. The hearth pad according to claim 1 wherein the hearth pad is capable of flexing at least 10 mm over a distance of approximately 1000 mm.

4. The hearth pad according to claim 1 wherein the flexible filler comprises a sanded acrylic caulking.

5. The hearth pad according to claim 1 wherein the flexible adhesive comprises a polyurethane based adhesive.

6. The hearth pad according to claim 1 wherein the backing has a thickness of approximately 1.5 mm.

7. The hearth pad according to claim 1 wherein the tiles have a thickness between 8 mm and 10 mm.

8. The hearth pad according to claim 1 wherein the hearth pad has an overall thickness between 10 mm and 12 mm.

9. The hearth pad according to claim 1 wherein the gaps between adjacent tiles have a width between 2 mm and 3 mm.

10. The hearth pad according to claim 1 wherein the top surface of the hearth pad forms a rectangle.

11. The hearth pad according to claim 10 wherein at least two corners of the rectangle are rounded.

12. The hearth pad according to claim 1 wherein outside edges of the tiles form an outside edge of the hearth pad.

13. The hearth pad according to claim 12 wherein the backing is recessed from the outside edge of the hearth pad.

14. The hearth pad according to claim 12 wherein the outside edges of the tiles are rounded or beveled.

15. The hearth pad according to claim 14 wherein the outside edges of the tiles are cut and polished.

16. A woodstove or pellet stove assembly comprising:
a hearth pad placed onto a floor, the hearth pad comprising:
a backing placed onto the floor, the backing being an aluminum sheet;
a plurality of tiles directly bonded to the backing using a flexible adhesive, the tiles being made of a rigid material and forming a top surface of the hearth pad, wherein a thickness of the backing is substantially less than a thickness of the tiles, wherein the backing has sufficient rigidity to substantially prevent flexing of the hearth pad during transport and installation, and wherein the backing has sufficient flexibility to substantially prevent cracking of the tiles when a woodstove or pellet stove is placed thereupon; and,
a flexible filler disposed in gaps between adjacent tiles, wherein the hearth pad has an overall thickness of less than 13 mm; and,
the woodstove or pellet stove placed onto the top surface of the hearth pad.

17. The woodstove or pellet stove assembly according to claim 16 wherein the hearth pad extends at least 450 mm from a front of the stove and at least 200 mm beyond sides of the stove.

18. The woodstove or pellet stove assembly according to claim 16 wherein the tiles are porcelain tiles or ceramic tiles.

19. The woodstove or pellet stove assembly according to claim 16 wherein the flexible adhesive comprises a polyurethane based adhesive and wherein the flexible filler comprises a sanded acrylic caulking.

20. A method for providing a woodstove or pellet stove assembly comprising:
providing a hearth pad comprising:
a backing for being placed onto a floor, the backing being an aluminum sheet;
a plurality of tiles directly bonded to the backing using a flexible adhesive, the tiles being made of a rigid material and forming a top surface of the hearth pad; and,
a flexible filler disposed in gaps between adjacent tiles, wherein a thickness of the backing is substantially less than a thickness of the tiles, wherein the backing has sufficient rigidity to substantially prevent flexing of the hearth pad during transport and installation, and wherein the backing has sufficient flexibility to substantially prevent cracking of the tiles when a woodstove or pellet stove is placed thereupon and, wherein the hearth pad has an overall thickness of less than 13 mm;
moving the hearth pad to a predetermined location of the floor;
placing the hearth pad onto the floor at the predetermined location; and,
placing the woodstove or pellet stove onto the top surface of the hearth pad.

21. The method for providing a woodstove or pellet stove assembly according to claim 20 wherein the stove is placed onto an existing combustible floor.

* * * * *